US008433831B2

(12) United States Patent
Ost et al.

(10) Patent No.: US 8,433,831 B2
(45) Date of Patent: Apr. 30, 2013

(54) METHOD FOR PROGRAMMING A SAFETY-ORIENTED PROGRAMMABLE LOGIC CONTROLLER AND ROUTER FUNCTION BLOCK

(75) Inventors: Jochen Ost, Lohr-Rodenbach (DE); Michael Muehlbauer, Gemuenden am Main (DE); Michael Seubert, Retzstadt (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 12/627,126

(22) Filed: Nov. 30, 2009

(65) Prior Publication Data
US 2010/0138568 A1 Jun. 3, 2010

(30) Foreign Application Priority Data
Dec. 1, 2008 (DE) .......................... 10 2008 059 841

(51) Int. Cl.
*G06F 3/00* (2006.01)
(52) U.S. Cl.
USPC ................................. 710/33; 710/10; 326/37
(58) Field of Classification Search .................... 710/69, 710/10; 326/37–39; 716/117, 121
See application file for complete search history.

(56) References Cited

U.S. PATENT DOCUMENTS

| 6,911,840 | B1* | 6/2005 | Milne et al. ...................... 326/38 |
| 7,088,133 | B2* | 8/2006 | Lee et al. ......................... 326/39 |
| 7,142,557 | B2* | 11/2006 | Dhir et al. ....................... 370/463 |
| 7,685,340 | B1* | 3/2010 | Gaither ........................... 710/69 |
| 7,913,022 | B1* | 3/2011 | Baxter ............................. 710/305 |
| 7,934,038 | B1* | 4/2011 | Kao et al. ........................ 710/305 |
| 2003/0194090 | A1* | 10/2003 | Tachikawa ..................... 380/270 |
| 2006/0277346 | A1* | 12/2006 | Doak et al. ..................... 710/305 |
| 2009/0164030 | A1 | 6/2009 | Schultze et al. |

FOREIGN PATENT DOCUMENTS

DE 10 2007 062 453 5/2009

OTHER PUBLICATIONS

Dugganapally, Design and Implementation of FPGA Configuration Logic Block Using Asynchronous Semi-Static NCL Circuits, Mar. 2008, Ieee, pp. 1-6.*
IEC 61131-3 The Fast Guide to Open Control Software, Prepared by Real Time Automation, 2008 (in English).
ISO 13849-1"Safety of Machinery—Safety-Related Parts of Control Systems—Part S General Principles for Design" International Standard, Second Edition Nov. 1, 2006 (in English).
Safety of Machinery, Notes on the Application of Standards EN 62061 and EN ISO 13849-1, German Electrical and Electronic Manufacturer'S Association, Apr. 2008 (in English).
IEC 62061: Safety of Machinery—Functional Safety of Safety-Related Electrical, Electronic and Programmable Electronic Control System, Jul. 16, 2004 (in English).

* cited by examiner

*Primary Examiner* — Ernest Unelus
(74) *Attorney, Agent, or Firm* — Michael J. Striker

(57) ABSTRACT

The present invention relates to a method for programming a safety-oriented programmable logic controller (10) which is connectable to a device (3) which performs a device-integrated safety function and may be activated using predetermined, first data (100), in which case the programmable logic controller (10) is equipped with at least one first program part (1, 1') for providing second data (200) for activating the device-integrated safety function, and with a second program part (2) for automatically converting the second data (200) into the first data (100); the present invention also relates to a related router function block (2) for a PLC (10).

13 Claims, 2 Drawing Sheets

METHOD FOR PROGRAMMING A SAFETY-ORIENTED PROGRAMMABLE LOGIC CONTROLLER AND ROUTER FUNCTION BLOCK

BACKGROUND OF THE INVENTION

The present invention relates to a method for programming a safety-oriented programmable logic controller, a router function block, an arithmetic logic unit, a computer program, and a computer program product.

Safety-oriented programmable logic controllers (SO-PLCs) are often programmed using the programming languages defined in IEC 61131-3 (e.g., ST: structured text; FBD: function block diagram; LD: ladder diagram; ... ). Per the safety software requirements of ISO 13849-1 and EN 62061, the use of graphic programming languages such as LD and FBD is recommended. The present invention is not limited to these languages, but rather is directed in general to safety-oriented PLC programming. The programming is carried out using function blocks (program blocks), each of which contains one or more statements that are related in terms of technology or function. A complete PLC program is typically composed of a plurality of function blocks, it being possible to enter the individual blocks in different languages depending on the PLC application. Function blocks (FBs) contain the actual user program and may be supplied with different data at each invocation ("instances"). A safety-oriented function block is often referred to as a "SO-FB", and a safety-oriented function block for activating a safe operating mode, e.g., motion, in a drive, is often referred to as a "safe motion FB". Function blocks for programming a SO-PLC are closed program elements which must be tested and/or certified, e.g., by TUV or a professional association, depending on the applicable legal requirements.

The scope of safety-oriented functions in drives is continually increasing and offers far more than merely a safe shut-off of the machine. The applications are becoming increasingly more complex, in particular in the case of interconnected safety regions and/or multiple accesses to the danger zone. The safety functions must be differentiated between installers, operators, service personnel, and cleaning personnel. Due to the modular design of machines and the configuration requests of customers, there is a need for a flexible safety solution that is comparable to the classical automation solution.

Programmable safety systems are therefore replacing the classical, discretely wired concepts realized in relay logic to an increasing extent since they provide the flexibility that is required. The interface between the PLC and the drive is therefore particularly significant. Control and status information must be exchanged between the safety-oriented components. In addition, the status of the integrated safety functions must be synchronized with the status of the process control.

The interface between the safety-oriented logic (SO-PLC program) and the drive-integrated safety function (typically a safety monitor in the drive) includes inputs and outputs to the SO-PLC program, and "internal" signals to the system level, which must be routed by the programmer to the SO function in the drive. If a plurality of function blocks that activate a drive-integrated safety function is included in the PLC program, they must be interlocked by the programmer and transferred to the related signals (via hardware or field bus) in the drive since they typically have different priorities. These priorities must also be represented in the control in order to minimize the number of error messages generated due to priorities being violated.

One possible communication medium between the safety-oriented logic and the drive-integrated safety function (typically a safety monitor in the drive) is, e.g., a safe field bus transfer (e.g., PROFIsafe, SERCOS safety, etc.) or a hardware coupling. In this case as well, the programmer must utilize the appropriate interface on the side of the safety logic, i.e., depending on the medium used, the appropriate SO signals must be interconnected with the interface-dependent signals. These may differ depending on the communication medium. This is a complex undertaking and requires detailed knowledge of the various interfaces of the different communication media.

Finally, the SO-FBs must be instantiated individually by the SO programmer. In so doing, care must be taken to ensure that every FB is instantiated only once at the most. Otherwise, various instances of a SO-FB could request contradictory safety functions.

In all, implementing drive-integrated safety functions via the programming of a SO-PLC is a very elaborate task.

On the basis of this prior art, the present invention provides a method for programming a safety-oriented programmable controller, a router function block, an arithmetic logic unit, a computer program, and a computer program product having the features of the independent claims. Advantageous developments are the subject matter of the dependent claims and the description that follows.

The teaching according to the present invention relates to the programming of a safety-oriented programmable logic controller that is connectable to a device. The device provides an integrated safety function that is activatable using predetermined, in particular manufacturer-specific, first data. The programmable logic controller is now equipped with at least one first program part for providing second data for activating the device-integrated safety function, and with a second program part for automatically converting the second data into the first data.

The first and/or second program part are/is preferably a function block (FB) of a PLC programming environment; according to one aspect of the present invention, the second program part is a router function block. Although mainly function blocks are described below, it should be noted that the teaching according to the present invention relates to all types of first and second program parts, and is not limited to function blocks.

The device-integrated safety function is preferably a drive-integrated safety function. The safety functions of the drive are often realized as monitoring functions. When the monitoring functions in the drive become activated, they initiate a drive-based failsafe reaction. This case should not occur during operation, however, since it typically limits the availability of the system when synchronized axles are involved. As a result, a related control (motion control) should always specify appropriate guide variables so that the monitoring functions do not become activated.

SUMMARY OF THE INVENTION

A large number of disadvantages of the prior art may be overcome using the present invention. The user is no longer required to connect first program parts, i.e., SO-FBs in particular, to the existing device-integrated safety functions on his own. A source of error in PLC programming may therefore be eliminated. Particularly in the field of SO programming, extremely simple programming is therefore attained, which helps to prevent errors via user-friendliness and transparency.

The present invention utilizes the technical teaching of providing a proxy concept in SO programming, with the aim of preventing errors and thereby increasing the safety of the SO technology (when there is a possibility of making programming errors, the likelihood of a hazardous state occurring increases, thereby reducing safety). In all, incorporating the drive-integrated safety function into safety-oriented sequence control is greatly simplified, thereby limiting systematic errors to a minimum.

Further advantages that may be attained according to the present invention will be explained below with reference to preferred embodiments.

The second data of the first program parts are preferably automatically interlocked. It is no longer necessary to program interlocks of the various first program parts, e.g., safe motion FBs, or of the data that is provided in order to account for the different priorities of the various safety monitors in the drive. The interlocks are now automatically provided by the second program part or the router function block (proxy). The proxy preferably interlocks the individual SO-FBs. The various safety functions are therefore interlocked in the proxy, thereby ensuring that prioritizations related to the state machine of the drive are accounted for, and so that acknowledge signals are set accordingly. This additional logic is contained in the proxy, and so the user does not need to implement it, thereby preventing further possible user errors from occurring.

In the embodiment, the second program part is automatically instantiated when the device is linked into the program of the programmable logic controller. Preferably, an instance of the proxy FB is therefore automatically activated for this drive in the SO program, e.g., when a drive is activated. By automatically instantiating the proxy FB, the user does not need to configure the interface to the safety-oriented communication medium or the drive himself. User errors that may occur during configuration are therefore reduced. The safety or SO user program is therefore independent of the field bus connection, or, in general, of the communication medium that is used (e.g., coupling to SERCOS safety/PROFIsafe). The proxy FB is therefore located in the interface (system level) between the user program and the safety-oriented communication medium. The proxy FB has a manufacturer-specific status and control word, e.g., as the interface to the drive-integrated safety function. The signals may be interconnected, e.g., in a binary manner (SAFEBOOLs) or as (SAFE-)WORD.

Advantageously, the at least one first program part is automatically instantiated when the second program part is instantiated. In the embodiment, the proxy makes the SO FBs, that the user would like to use, available as FB instances, e.g., SafeStop1. In other words, the SO-FBs (safe motion FBs) are automatically instantiated when the proxy FB is instantiated. This also results in an ability to monitor, and/or a possibility of ensuring that only one instance at the most exists for each safe motion FB (of each drive). The programmer is no longer required to make certain that the safe motion FBs are instantiated correctly since this takes place automatically. The proxy FB is the interface between the user program and the drive-integrated safety function.

It is advantageous when the second program part automatically transfers the first data via an available data connection between the programmable logic controller and the device. This eliminates the need to program couplings, which are different depending on the communication medium, of the safe motion FBs to the drive-internal SO function, which is an elaborate process. The present invention makes programming independent of the fundamental communication medium.

The proxy is a "generic" interface of the SO functions of the drive to the safety logics. It is also possible to prevent a faulty assignment to the drive, i.e., the addressing of an incorrect drive. In the embodiment, the safety signals are automatically interconnected to the drive in the case of an SO bus (e.g., PROFIsafe or SERCOS safety). In the case of transmission via a safety-oriented field bus, the programming system may automatically connect the interface of the SO signals since it either accounts for a status that may have been fixedly specified by the SO field bus, or it may specify a variable mapping of the SO signals on the bus made possible by the SO field bus. An automated interconnection of the SO signals from the proxy to the drive is hereby made possible.

According to a preferred embodiment, the at least one first program part is parameterized using dialogs. Publication DE 10 2007 062 453.2 ("Method for Programming and/or Diagnosing a Programmable Logic Controller") describes how inputs/outputs of FBs may be depicted using dialogs in a manner that is particularly advantageous for the programmer, and how input values may be changed. In SO functions, these dialogs must also fulfill the requirements on the safe input of data (analogous to the safe programmability in the PLC programming of the SO program). According to the embodiment, the SO programming preferably includes dialog-supported input or diagnosis output, and this input/output fulfills the SO requirements on the programming system.

Advantageously, a wizard functionality is included for providing the at least one first program part. By using the wizard functionality to create a SO function, it is possible to instantiate only those SO-FBs that are required in the SO program. Furthermore, some of the inputs of the safe motion FBs may be preset with values to be entered in the wizard, and/or it may even be possible to use the wizard to enter interconnections of inputs/outputs. Given that only the required SO-FBs are instantiated, the SO program (complexity) is simplified, and/or the amount of memory required to store the instantiated variables is reduced. It is also possible to display the above-mentioned dialogs in the wizard in order to support the input of FB input values.

Preferably, a wizard functionality is included for instantiating the at least one first program part and/or the second program part. In other words, a wizard functionality is provided for instantiating the SO-FBs and/or the proxy FBs when an axle is set up. If an axle is set up within the context of non-safety oriented programming, this may be supported by a wizard functionality. Data on the axle, such as hardware type, firmware version, device addresses, etc., may then be entered in the wizard. This may also be linked to the fact that the particular axle is likewise instantiated within the context of the SO programming with proxy FB and SO-FBs.

A router function block for a safety-oriented programmable logic controller, which is designed to automatically convert second data provided by at least one first program part of the programmable logic controller into the first data in order to activate a device-integrated safety function which may be activated using predetermined first data, is also a subject of the present invention.

In the embodiment, a related router function block is designed to automatically interlock the second data of the first program parts.

Furthermore, it is advantageous when a related router function block is designed to automatically instantiate the at least one first program part.

According to a preferred embodiment, a router function block is designed to automatically transfer the first data via an available data connection between the programmable logic controller and the device.

In a particularly advantageous manner, a related router function block is furthermore designed to activate a drive-integrated safety function.

The router function block according to the present invention is particularly suited, in particular in its embodiments, to implement the method according to the present invention.

Reference is made to the explanations of the method according to the present invention with regard for further features, embodiments, and advantages of the router function block.

An arithmetic logic unit according to the present invention is designed, in particular in terms of programming, to implement a method according to the present invention.

The present invention likewise relates to a computer program having program code means to carry out all steps of a method according to the present invention when the computer program is run on a computer or a related arithmetic logic unit.

The computer program product—which is provided according to the present invention—comprising program code means which are stored on a computer-readable data storage device is designed to implement all steps of a method according to the present invention when the computer program is run on a computer or a related arithmetic logic unit. Suitable data storage devices are, in particular, diskettes, hard drives, Flash drives, EEPROMs, CD-ROMs, DVDs, etc. It is also possible for a program to be downloaded from computer networks (Internet, intranet, etc.).

Further advantages and embodiments of the present invention result from the description and the attached drawings.

It is understood that the features mentioned above and which are described below may be used not only in the combination described, but also in other combinations or alone, without leaving the scope of the present invention.

The present invention is depicted schematically with reference to embodiments shown in the drawings, and it is described in detail below with reference to the drawings.

DETAILED DESCRIPTION OF THE PREFERRED EMBODIMENTS

Figure 1:
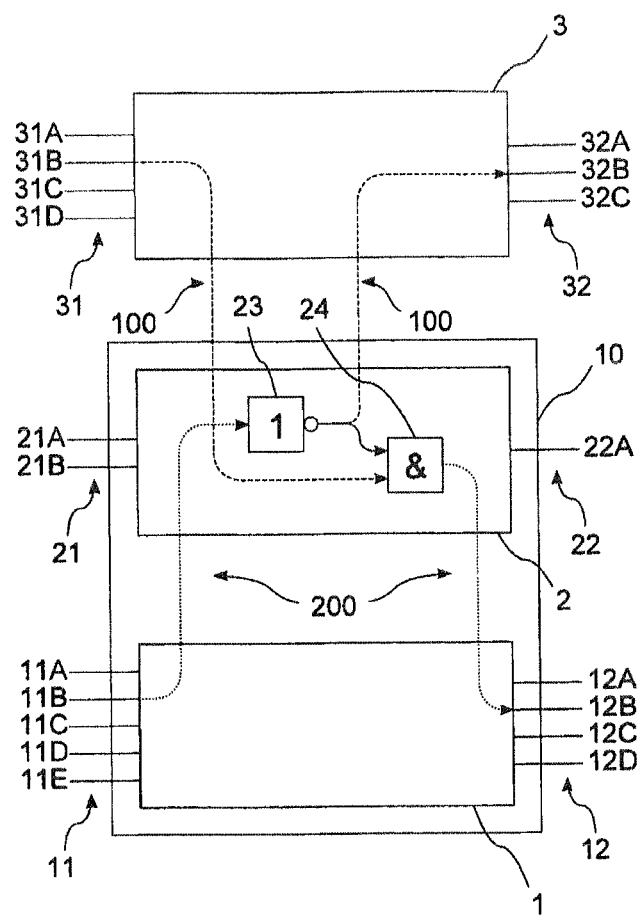
FIG. 1 shows a safety-oriented programmable logic controller which is connected to a device, according to a particularly preferred embodiment of the present invention.

FIG. 1 shows a schematic depiction of a safety-oriented programmable logic controller 10 that is connected to a device 3. The arrows symbolize data flows. The programmable logic controller includes a first program part 1 and a second program part 2. Using the first program part, second data 200 (indicated using dotted lines) are forwarded to second program part 2 which receives them. Although only one first program part 1 and a second program part 2 are depicted in FIG. 1, it is understood that a controller 10 according to the present invention may also include any other number of particular program parts, in particular a plurality of first program parts 1. In the embodiment, second program part 2 includes gates 23 and 24 which are designed as NOT gate 23 and AND gate 24. It is noted that second program part 2 may also include other and additional influencing devices, such as appropriate gates, logic units, and the like.

Safety-oriented programmable logic controller 10 is connected to device 3 which provides safety functions that are integrated in the device and are activatable using predetermined, in particular manufacturer-specific, first data 100. Controller 10 provides first data 100 (indicated using a dashed line) to device 3, and receives them from device 3. Device 3 may be, e.g., a drive-integrated controller 3 that provides safety functions related to the drive that is activated and/or regulated by this controller. In contrast, program parts 1 of programmable logic controller 10 are preferably system-integrated program parts that are realized in a programming language, e.g., via function blocks (FB) that may be executed in the related system.

In particular, first program part 1 of controller 10 is a part of controller 10, which may be programmed by the user, and which is preferably realized using a safety function block (FB), while second program part 2 is a router function block that functions automatically. The router function block is made available to the user in a transparent manner in the related environment, and is preferably not "visible" to the user.

A proxy concept is realized in the SO programming by providing second program part 2. By providing a proxy or router function block 2, it is no longer necessary for a user to connect, on his own, first program parts 1, i.e., safety-oriented function blocks in particular, to the existing device-integrated safety functions. In particular, it is no longer necessary to program interlocks of various first program parts 1 or parameters provided in first program parts 1, e.g., safe motion FBs, in order to account for priorities and/or conflicts of the various safety monitors in the drive.

First program parts 1 and second program parts 2 of safety-oriented, integrated, programmable logic controller 10 and device 3 include input parameters and output parameters that are explained in greater detail below. It is understood that, in addition to the input and output parameters to be presented below, it is also possible to provide any other parameters without leaving the scope of the present invention.

First program part 1 includes input parameters 11 and output parameters 12. Input parameters 11 are labelled individually as 11A through 11E. Input parameters 11A through 11E may be, e.g., Boolean values, whole numbers, floating decimal point numbers, binary Boolean values as described above, (SAFE-)BOOLs, (SAFE-)WORDs, and/or time parameters or values. As a result, it is possible to signal a safe system state using a binary Boolean value. Furthermore, e.g., an identification number of an axle may be made known, a monitoring time may be indicated, and/or a reset may be requested or carried out. A signal for activating or deactivating components, e.g., drive components, may be provided, in particular via related input values.

Via output values 12 which are labeled individually as 12A through 12D, it is possible to provide related output parameters. If a request was issued via input parameters 11A through 11E to bring the device to a halt, for example, the stoppage that took place may be signaled using a related output value 12 which may be requested of an activated device. Furthermore, related output values, error values, or diagnostic parameters may be indicated, or a (safe) operating state of the device may be signaled.

It is further understood that input and output parameters 11 and 12, respectively, of first program part 1 depend on the embodiment of the particular block that is used. It is further understood that program part 1 and/or a function block that is used for this purpose is the region of safety-oriented programmable logic controller 10 that may be influenced by a programmer. In contrast, program part 2 is provided in controller 10 and may be designed to be transparent in particular, and so the programmer need not necessarily perceive the function of second program part 2. Second program part 2 typically operates automatically in the form of a proxy, has only rudimentary input and output parameters, and is configured only once using parameters. In particular, related input parameters 21 or 21A and 21B may be parameters for activating second program part 2. Furthermore, an assignment of a related second program part 2 to an axle is shown. A signal that indicates that second program part 2 is in a ready-to-operate state, for example, may be provided as output parameter 22 or 22A of automatic second program part 2.

Device 3 also includes input parameters 31 and output parameters 32 that are depicted in an analogous manner as input parameters 31A through 31D and 32A through 32C. Input parameters 31 of device 3 are typically provided by the device, e.g., an axle, that is activated by device 3. For example, it may be a signal that indicates that the device is operating normally. Furthermore, an input parameter 31 may display, e.g., that a safety drive block in the device was triggered. For example, it may also be indicated that a safe standstill is active in the device, and/or that a safe motion of the device or a component exists. Output parameters 32 of device 3 may activate, e.g., an operating mode of the device, trigger a drive block, and/or activate an enabling device.

The mode of operation of structure 100 will be explained below using an example. Input parameter 11B of first program part 1 is a safety-oriented parameter. If parameter 11B has the value "1", e.g., in the form of a binary Boolean value, the system is in a safe state. However, if parameter 11B has the value "0", then an unsafe system state exists, and an appropriate safety measure must be implemented, e.g., shutting off a drive or implementing a drive block. This case will be explained below.

First program part 1 initially forwards input parameter 11B to second program part 2. Via NOT gate 23, the value is inverted and forwarded in the form of first data 100 to device 3, where it is provided as output parameter 32B, and is used to shut off a related device or to initiate a safety measure. For example, device 3 triggers a drive block. At the same time, the value is made available at an AND gate. After the drive block is activated via output parameter 32B, device 3 receives the response from the activated device via input parameter 31B that a related drive block was triggered. In the form of first data, device 3 now makes this value available to controller 10 and, in this case, to second program part 2, where it is likewise supplied to AND gate 24. Both inputs of the AND gate therefore have the value "1", and so the output value of the gate likewise takes on the value "1". This signals that appropriate action was taken due to the unsafe system state that exists. This value is forwarded in the form of second data 200 to first program part 1, where it is made available in the form of output parameter 12B, and the implementation of the action is displayed as parameter 12B in the form of the value "1".

Figure 2:
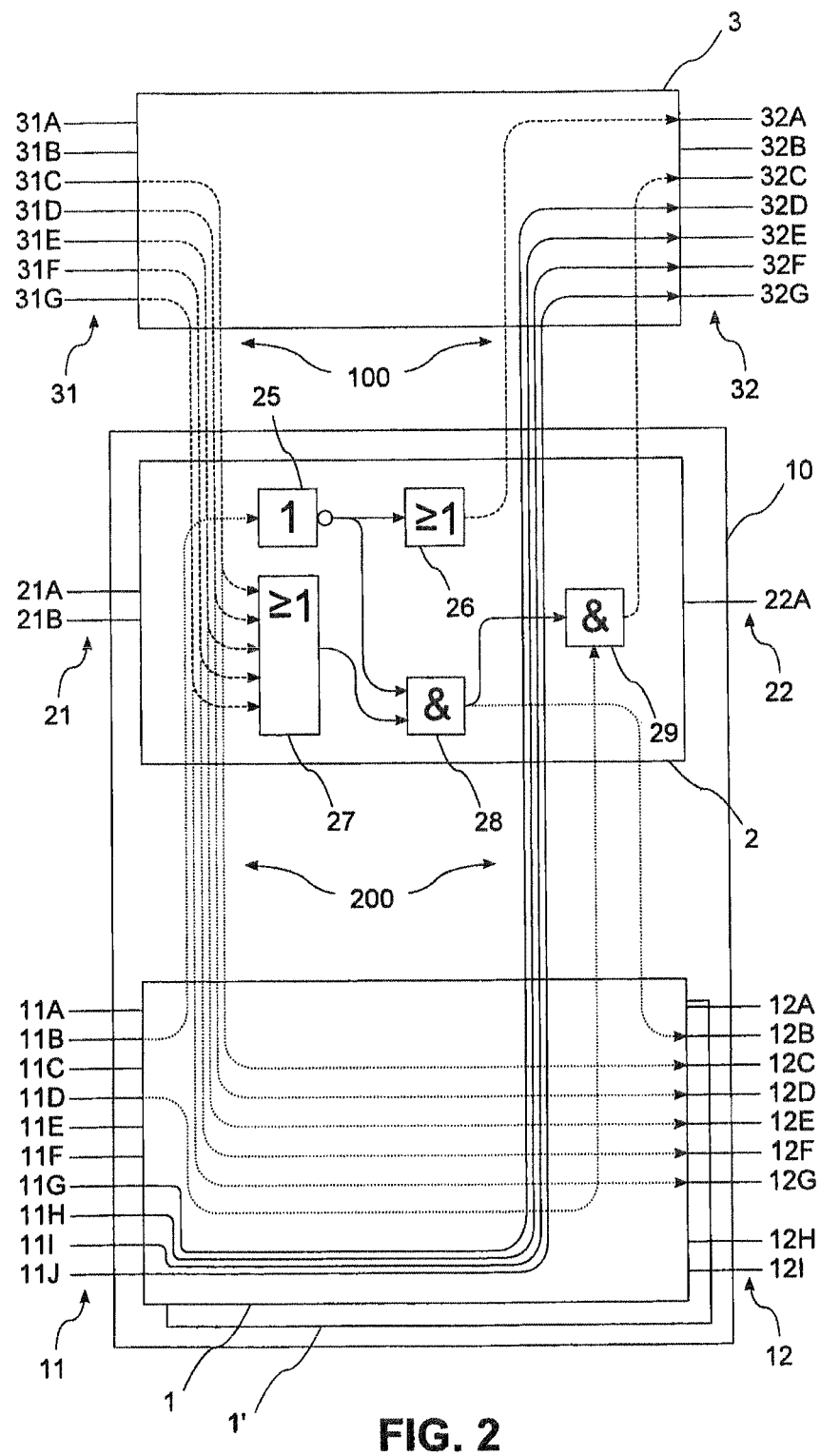
FIG. 2 shows a further safety-oriented programmable logic controller which is connected to a device, according to a particularly preferred embodiment of the present invention.

FIG. 2 shows a safety-oriented programmable logic controller 10 that is connected to a device 3. In contrast to the depiction shown in FIG. 1, second program part 2 in this case is shown as including a number of additional elements that make it possible to interlock and/or prioritize second data 200. It is likewise pointed out here that additional devices of a similar type may be provided. The structure shown in FIG. 2 also has structural features that are substantially similar to those shown in FIG. 1.

The mode of operation is explained below with reference to a single first program part 1. However, it is understood that second data 200 may also be provided by any other number of first program parts, as illustrated by first program parts 1 and 1', and that corresponding second data of several first program parts 1, 1' may be present.

A lockout and/or prioritization of input parameters are/is depicted in FIG. 2. A distinction must be made between input parameters and the like to be prioritized and/or interlocked, for which a related interlocking and/or prioritization are/is not required. For instance, program part 1 includes input parameters 11G through 11J which are forwarded (routed) mainly by program part 2, unchanged, to device 3, where they are used in the form of output parameters to control, e.g., a drive. In particular, these parameters may be parameters that do not result in critical machine situations even when they occur or are changed simultaneously.

Input parameters 11B and 11D stand in sharp contrast thereto. They may be parameters, for instance, that relate to an operating mode, a shut-off or blockage of a component and/or an enabling device. To prevent conflicts, these parameters must be prioritized by the second program part. As a result, the situation may be prevented in which the monitors in the drive become activated, e.g., within the framework of a drive-based failsafe reaction. The prioritization and/or interlocking occur automatically in second program part 2 and without further intervention by the operator. The operator need only program first program part 1, which may be a function block, and need not worry about prioritizing the input and output parameters.

First, input parameter 11B will be considered in detail. Input parameter 11B is supplied in the form of second data 200 to second program part 2, and to a NOT gate 25 in this case. if an unsafe operating mode is signaled by the value "0", e.g., via input parameter 11B, the output of NOT gate 25 has the value "1". This value is provided at OR gate 26. OR gate 26 includes further input channels that are not depicted, so that, if at least one input value "1" is present at OR gate 26, first data 100 are forwarded to device 33, and to output channel 32A in this case. In the structure shown, any change made to an input parameter 11B therefore brings about a corresponding but inverse change to output parameter 32A.

Furthermore, NOT gate 25 provides the value "1" at AND gate 28. At the same time, input parameters 31C through 31G of device 3 are processed. Input parameters 31C through 31G are provided in the form of second data as output parameters 12C through 12G of first program part 1, thereby making them known to the system. Furthermore, parameters 31C through 31G are provided as first data to second program part 2, and to OR gate 27 in this case. If at least one input parameter 31C through 31G of device 3 has the value "1", OR gate 27 outputs a value "1" to AND gate 28. In the example under consideration, both input values and AND gate 27 therefore have the value "1", and so AND gate 28 outputs the value "1". The output value of AND gate 28 is forwarded to further AND gate 29. Furthermore, an input parameter 11D of first program part 1 is likewise forwarded to AND gate 29. AND gate 29 likewise outputs the value "1" only if input parameter 11D and the second input value of AND gate 29 take on the value "1"; the value "1" is then output in the form of first data as output parameter 32C of device 3.

As a result, input parameter 11D of first program part 1 therefore unfolds an effect on an output parameter 32C of device 3 if input parameter HB also takes on the value "0" and, simultaneously, an input parameter 31C through 31D of device 3 has the value "1". Input parameter 11D may therefore be interlocked until further conditions occur.

By prioritizing and/or interlocking in a targeted manner at the system level, it is possible to prevent conflict between parameters and thereby prevent units that were activated accordingly from being switched off, in particular in the form of a failsafe reaction. It is emphasized that the aforementioned example presents only one possibility for performing prioritization and/or interlocking, and that any other type of prioritization of related values relative to one another may be carried out.

It is understood that only particularly preferred embodiments of the present invention are depicted in the figures shown. Any other type of embodiment is also feasible, without leaving the scope of the present invention.

What is claimed is:

1. A method for programming a safety-oriented programmable logic controller (SO-PLC), the method comprising:
    connecting said safety-oriented programmable logic controller (SO-PLC) to a device that provides a device-integrated safety function, which is a drive-integrated safety function, wherein said drive-integrated safety function is activated using predetermined, first data;
    equipping the safety-oriented programmable logic controller (SO-PLC) with at least one first program part, which is programmed by a user, for providing second data;
    equipping the safety-oriented programmable logic controller (SO-PLC) with at least one second program part having at least two influencing devices including a NOT gate, a first OR gate, a second OR gate, and a first AND gate and a second AND gate, wherein said at least one second program part is instantiated when the device is linked into a program of the safety-oriented programmable logic controller (SO-PLC), for converting the second data into the first data using the at least two influencing devices, wherein the first OR gate is configured to receive a value determined by said NOT gate and based on said value, forward said first data to an output channel and wherein said first AND gate is configured to receive inputs from said NOT gate and said second OR gate and forward first data to said second AND gate and to an output channel,
    wherein said first data are also made available at the first AND gate, which also receives response-data of the activated device-integrated safety function of the device in the form of the first data and is forwarded output data in the form of second data to the first program part, wherein said device-integrated safety function is activated using the predetermined, first data, wherein the second program part automatically interlocks the second data of the at least one program part.

2. The method as recited in claim 1, in which the first and/or second program part is designed as a function block of a PLC programming environment.

3. The method as recited in claim 1, in which the at least one first program part is automatically instantiated when the second program part is instantiated.

4. The method as recited in claim 1, in which the second program part automatically transfers the first data via an available data connection between the safety-oriented programmable logic controller (SO-PLC) and the device.

5. The method as recited in claim 1, in which the at least one first program part is parameterized using dialogs.

6. The method as recited in claim 1, in which a wizard functionality provides the at least one first program part.

7. The method as recited in claim 1, in which a wizard functionality instantiates the at least one first program part and/or the second program part.

8. A non-transitory computer readable medium containing a router function block for a safety-oriented programmable logic controller (SO-PLC), comprising:
    means for automatically converting second data provided by at least one first program part of the safety-oriented programmable logic controller (SO-PLC) into first data in order to activate a device-integrated safety function, wherein said device-integrated safety function is a drive-integrated safety function of a device connected to said safety-oriented programmable logic controller (SO-PLC), wherein said device-integrated safety function is activatable using predetermined first data, wherein the converted second data are also made available to at least one influencing device for comparing the second data with response data of the activated device-integrated safety function of the device, wherein said response data are made available to the influencing device in the form of first data, and the influencing device is forwarded output data in the form of second data back to the first program part, and wherein the non-transitory computer readable medium is configured to automatically interlock the second data,
    wherein said at least one influencing device includes a NOT gate, a first OR gate, a second OR gate, and a first AND gate and a second AND gate, wherein at least one second program part of the safety-oriented programmable logic controller (SO-PLC) is instantiated when the device is linked into a program of the safety-oriented programmable logic controller (SO-PLC), for converting the second data into the first data using the at least two influencing devices, wherein said first OR gate is configured to receive a value determined by said NOT gate and based on said value, forward said first data to an output channel and wherein said first AND gate is configured to receive inputs from said NOT gate and said second OR gate and forward first data to said second AND gate and to an output channel.

9. The non-transitory computer readable medium as recited in claim 8, which is designed to automatically instantiate the at least one first program part.

10. The non-transitory computer readable medium as recited in claim 8, which is designed to automatically transfer the first data via an available data connection between the safety-oriented programmable logic controller (SO-PLC) and the device.

11. A non-transitory computer readable medium containing an arithmetic logic unit which is configured for carrying out a method as recited in claim 1.

12. A non-transitory computer readable medium containing a computer program comprising program code means for carrying out all steps of a method as recited in claim 1 when the computer program is run on a computer or an appropriate arithmetic logic unit.

13. A non-transitory computer readable medium containing a computer program product comprising program code means stored on a computer-readable data storage device for carrying out all steps of a method described in claim 1 when the computer program is run on a computer or an appropriate arithmetic logic unit.

* * * * *